(12) United States Patent
Lodhie

(10) Patent No.: US 6,886,963 B2
(45) Date of Patent: May 3, 2005

(54) LED LIGHT BULB FOR USE IN AN ILLUMINATED AIRCRAFT SIGN

(76) Inventor: Pervaiz Lodhie, 23105 Kashiwa Ct., Torrance, CA (US) 90505

( * ) Notice: Subject to any disclaimer, the term of this patent is extended or adjusted under 35 U.S.C. 154(b) by 0 days.

(21) Appl. No.: 10/452,107

(22) Filed: Jun. 2, 2003

(65) Prior Publication Data

US 2003/0235055 A1 Dec. 25, 2003

Related U.S. Application Data

(63) Continuation-in-part of application No. 29/162,853, filed on Jun. 21, 2002, now Pat. No. Des. 474,849.

(51) Int. Cl.[7] .............................................. F21V 21/00
(52) U.S. Cl. ....................... 362/249; 362/226; 362/470; 362/800; 439/547
(58) Field of Search ................................ 362/470, 249, 362/226, 237, 800, 812; 439/547; 313/512

(56) References Cited

U.S. PATENT DOCUMENTS

| | | | | |
|---|---|---|---|---|
| 4,211,955 A | * | 7/1980 | Ray .............................. | 315/53 |
| 4,727,289 A | * | 2/1988 | Uchida ......................... | 315/71 |
| 4,772,869 A | | 9/1988 | Grammas et al. | |
| 5,151,679 A | | 9/1992 | Dimmick | |
| D331,980 S | | 12/1992 | Henderson | |
| 5,526,236 A | * | 6/1996 | Burnes et al. ................. | 362/20 |
| 5,647,658 A | | 7/1997 | Ziadi | |
| 5,806,965 A | * | 9/1998 | Deese ......................... | 362/249 |
| 5,842,297 A | | 12/1998 | Tung | |
| 5,887,968 A | * | 3/1999 | Logan ......................... | 362/241 |
| 5,964,051 A | | 10/1999 | Loeber et al. | |
| 6,152,568 A | * | 11/2000 | Baba et al. .................... | 362/23 |
| 6,220,722 B1 | * | 4/2001 | Begemann ................... | 362/231 |
| 6,227,679 B1 | * | 5/2001 | Zhang et al. ................ | 362/236 |
| 6,283,612 B1 | | 9/2001 | Hunter | |
| 6,345,902 B2 | * | 2/2002 | Ohkohdo et al. ............ | 362/226 |
| 6,371,636 B1 | * | 4/2002 | Wesson ...................... | 362/545 |
| 6,580,228 B1 | * | 6/2003 | Chen et al. .............. | 315/185 R |
| 6,659,632 B2 | * | 12/2003 | Chen .......................... | 362/545 |

\* cited by examiner

*Primary Examiner*—John Anthony Ward
(74) *Attorney, Agent, or Firm*—Irving Keschner

(57) ABSTRACT

An LED light bulb has a bulb base having an electrical contact, an outer sidewall, an insulator between the electrical contact and the outer sidewall. The LED light bulb further includes a bulb circuit board mounted upon the bulb base and extending upwardly therefrom. The bulb circuit board has a first side and a second side. A plurality of LEDs are mounted on the first and second sides of the bulb circuit board such that the plurality of LEDs are in electrical communication with the electrical contact through a resistor. A flange extending outwardly from the outer sidewall adjacent a bottom edge of the outer sidewall.

4 Claims, 7 Drawing Sheets

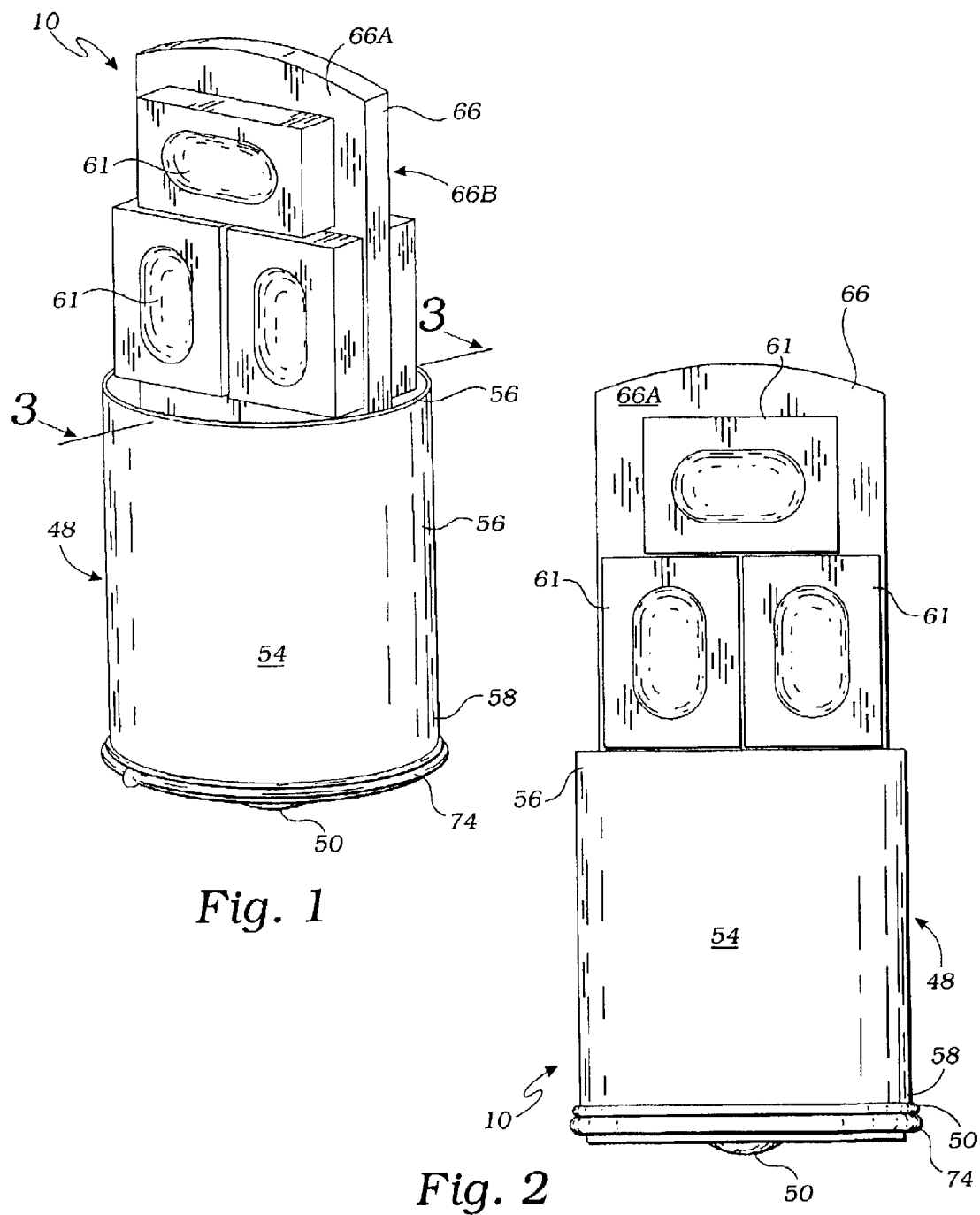

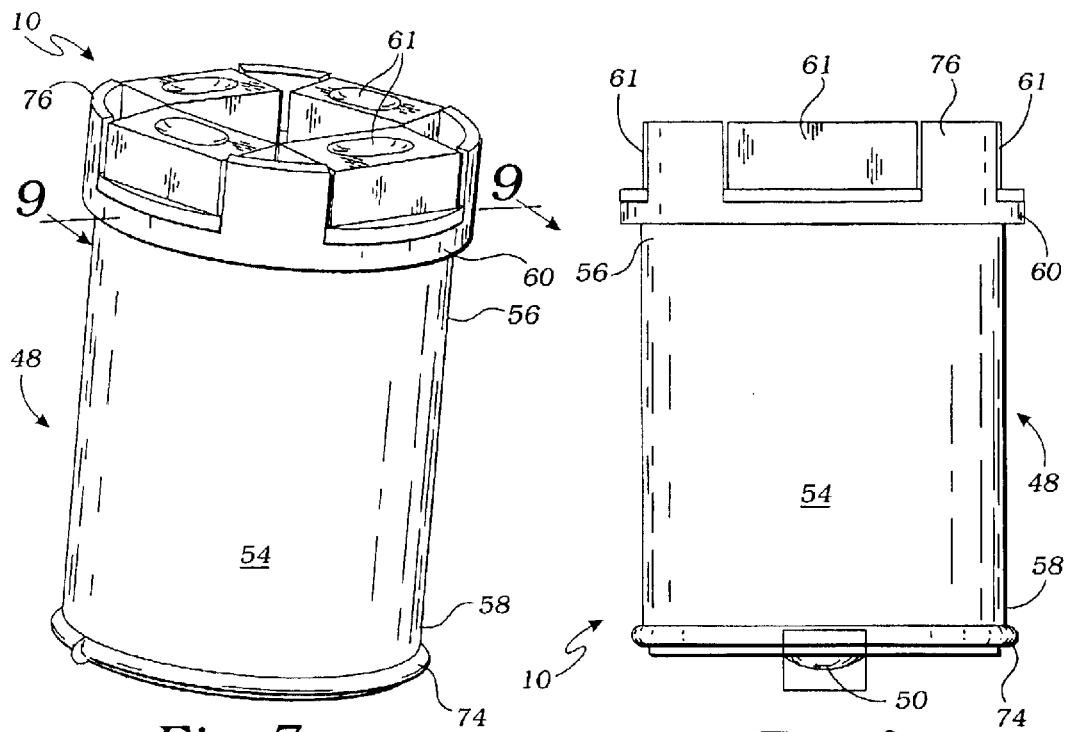
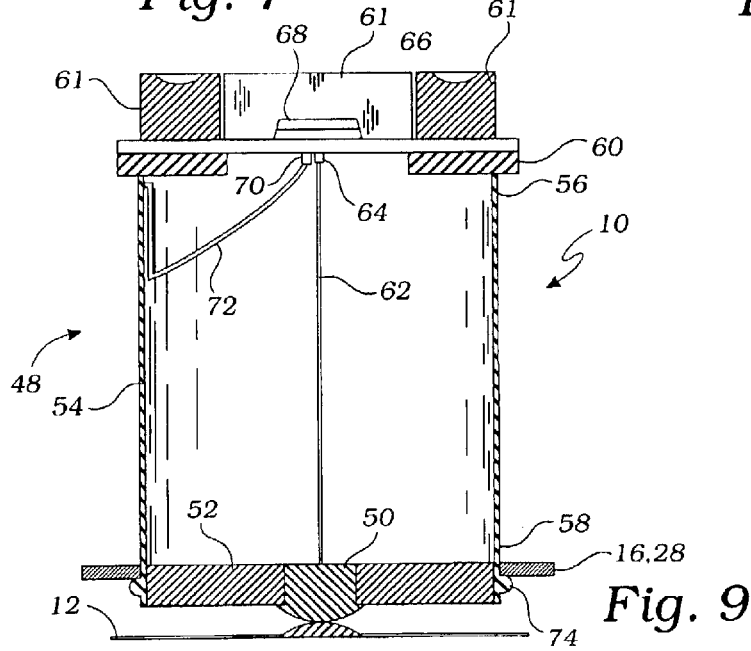
Fig. 7  Fig. 8  Fig. 9

LED LIGHT BULB FOR USE IN AN ILLUMINATED AIRCRAFT SIGN

CROSS-REFERENCE TO RELATED APPLICATIONS

This application for a utility patent is a continuation-in-part of a previously filed design patent, having the application Ser. No. 29/162,853, filed Jun. 21, 2002 now U.S. Pat. No. D,474,849.

STATEMENT REGARDING FEDERALLY SPONSORED RESEARCH

Not Applicable

BACKGROUND OF THE INVENTION

1. Field of the Invention

This invention relates generally to an LED light bulb, and more particularly to an LED light bulb that can be removably inserted into an LED light strip and used to illuminate at least one translucent portion of a sign, preferably an illuminated aircraft sign.

2. Description of Related Art

The following art defines the present state of this field:

Hunter, U.S. Pat. No. 6,283,612 B1, teaches a light emitting diode light strip that includes a rigid hollow tube sized to accommodate a printed circuit board. The printed circuit board has a positive and negative bus extending the full length of the board. One or more resistors are in contact with the positive bus on one end and a series of light emitting diodes on the other. The diodes are mounted through holes in the board and the anode of the diode is in communication with a resistor while the cathode of the diode contacts an adjacent diode anode connecting them in linked series through traces on the bottom of the circuit board. The end cathode in each series, engages the negative bus forming a predetermined group of diodes electrically coupled to a single resistor on one end and the negative bus on the other. A pair of end caps enclose the tube and an electrical cable is connected through the caps to the busses on the circuit board. A power supply is in contact, through the electrical cable, with the board providing low voltage direct current power through the busses to a predetermined group of light emitting diodes, for illumination of the area surrounding the light strip.

Ziadi, U.S. Pat. No. 5,647,658, teaches a fiber-optic lighting system is powered by a power supply connected to a high intensity light source which generates a beam of light. A first elongate light guide extends between a first end positioned within the beam of light and a second end positioned adjacent a lamp reflector. A second elongate light guide which is configured to emit light from a side also extends from a first end positioned within the beam of light. An elongate light fixture is positioned along the second light guide for directing light emitted from the side of the light guide.

Loeber et al., U.S. Pat. No. 5,964,051, teaches an emergency sign that includes a body having a top, two spaced apart sides, and a bottom defining a cavity. The sign includes a front cover having an inside surface and cut out portions extending through the cover forming indicia. The sign includes an array of LEDs disposed within the cavity, and a diffuser coupled to the cover and covering the indicia, the diffuser having cut away portions for permitting light from the light source to reflect off of the inside surface of the front cover. The diffuser may include pigment therein, which pigment is color matched to correspond to the wavelength of the light from the light source.

Tung, U.S. Pat. No. 5,842,297, teaches a ruminant sign that includes a base having a pair of opposed casings and a image plate made of transparent acrylic resin and engaged with the base. The base has a circuit board with a plurality of illuminators (LEDs) disposed therein. A front face and a rear face of the image plate have a number of display areas defined thereon by peripheral grooves of pictures or words. Each display area has a plurality of reflective surfaces formed therein in directions non-parallel to the beam directions of the illuminators. With this arrangement, each display area of the image plate will achieve a uniform intensity.

Dimmick, U.S. Pat. No. 5,151,679, teaches a sign having at least one light pipe, each light pipe made of light-transmitting material. The at least one light pipe is arranged to form a predetermined message or design, each light pipe having at least two ends and carrying at least one light source proximate at least one end, each light source directed towards another end of the light pipe in the direction of extension of the light pipe, a portion of the outer surface of each light pipe being translucent permitting light to exit therefrom, the sign further carrying electrical circuit means for energizing each light source, and means for mounting the at least one light pipe to form the predetermined message or design; whereby energizing of each light source causes light to be transmitted in each light pipe, light therefrom emerging through the translucent outer surface of each light pipe for the display of the predetermined message or design.

Other references of interest include Grammas et al., U.S. Pat. No. 4,772,869, and Henderson, U.S. D331,980.

The above-described references are hereby incorporated by reference in full.

The prior art teaches various forms of LED bulbs; however, the prior art does not teach a light bulb that includes a plurality of LEDs and a flange that enables the light bulb to be removably mounted on a light strip. The present invention fulfills these needs and provides further related advantages as described in the following summary.

SUMMARY OF THE INVENTION

The present invention teaches certain benefits in construction and use which give rise to the objectives described below.

The present invention provides an LED light bulb has a bulb base having an electrical contact, an outer sidewall, an insulator between the electrical contact and the outer sidewall. The LED light bulb further includes a bulb circuit board mounted upon the bulb base and extending upwardly therefrom. The bulb circuit board has a first side and a second side. A plurality of LEDs are mounted on the first and second sides of the bulb circuit board such that the plurality of LEDs are in electrical communication with the electrical contact through a resistor. A flange extending outwardly from the outer sidewall adjacent a bottom edge of the outer sidewall.

A primary objective of the present invention is to provide an LED light bulb having advantages not taught by the prior art.

Another objective is to provide an LED light bulb that is adapted to be mounted upon an LED light strip that is adapted to be mounted within an illuminated aircraft sign A further objective is to provide an LED light strip that is adapted to illuminate a sign having at least one translucent portion.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of a first embodiment of the present invention, an LED light bulb for use with an illuminated aircraft sign;

FIG. 2 is a front elevational view thereof;

FIG. 7 is a perspective view of a second embodiment of the LED light bulb;

FIG. 8 is a front elevational view thereof;

FIG. 9 is a sectional view thereof taken along line 9—9 in FIG. 7;

DETAILED DESCRIPTION OF THE INVENTION

Figure 3:
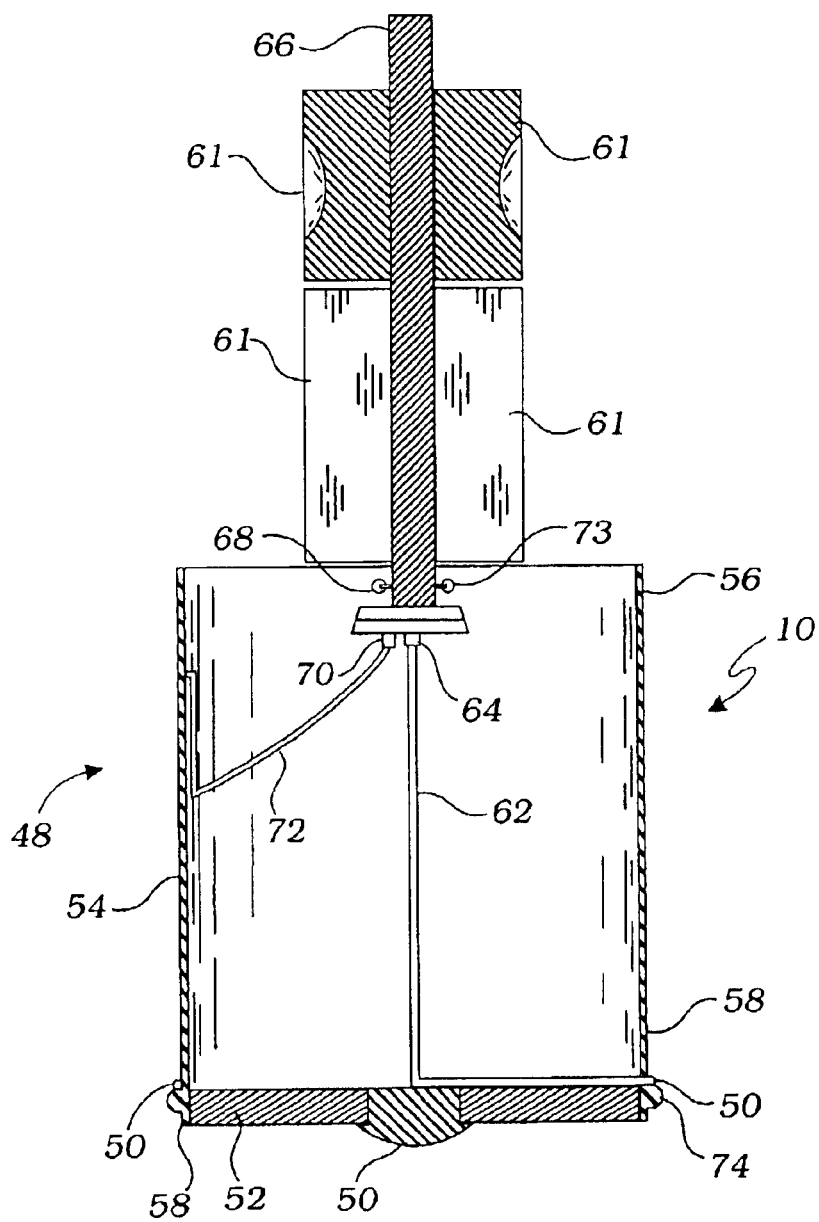
FIG. 3 is a sectional view thereof taken along line 3—3 in FIG. 1.

The above-described drawing figures illustrate the invention, a plurality of LED light bulbs 10 that are adapted to removably engage an LED light strip 12 for illuminating at least one translucent portion 80 of a sign 78, preferably an illuminated aircraft sign.

LED Light Bulbs

For purposes of clarity, we will often refer in the singular to an LED light bulb 10 with the understanding that this is a single one of the plurality of LED light bulbs 10.

Figure 6:
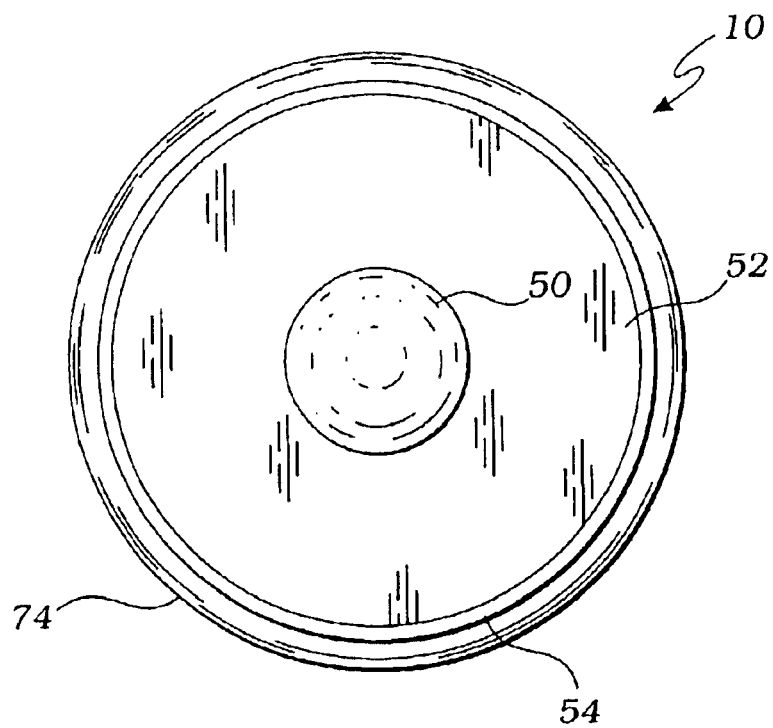
FIG. 6 is a bottom plan view thereof.
Figure 10:
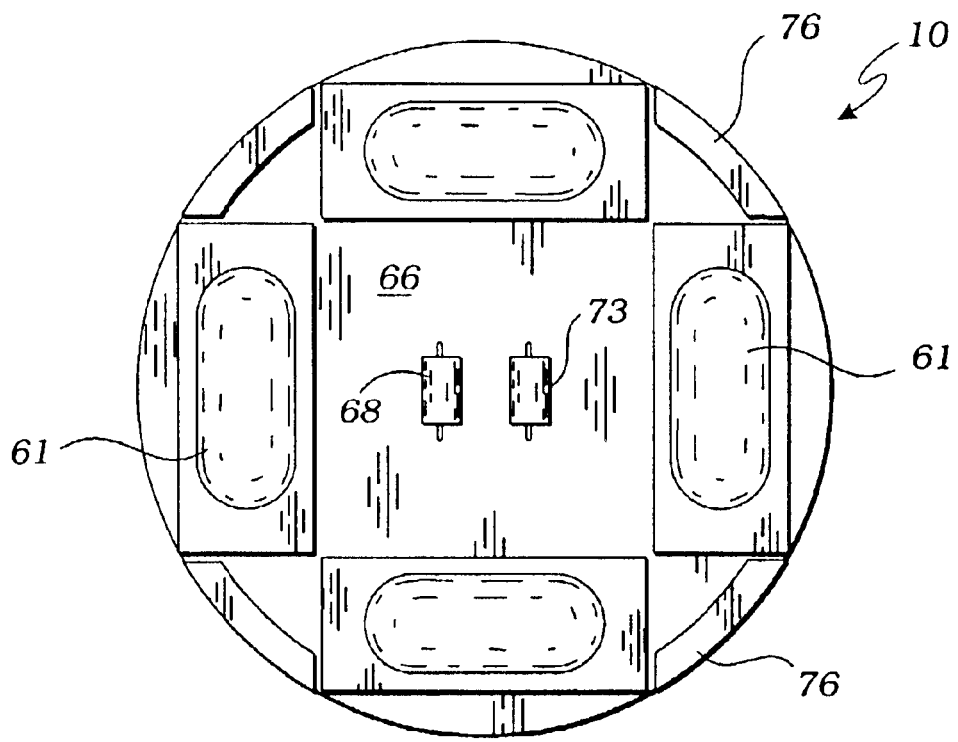
FIG. 10 is a top plan view thereof.
Figure 11:
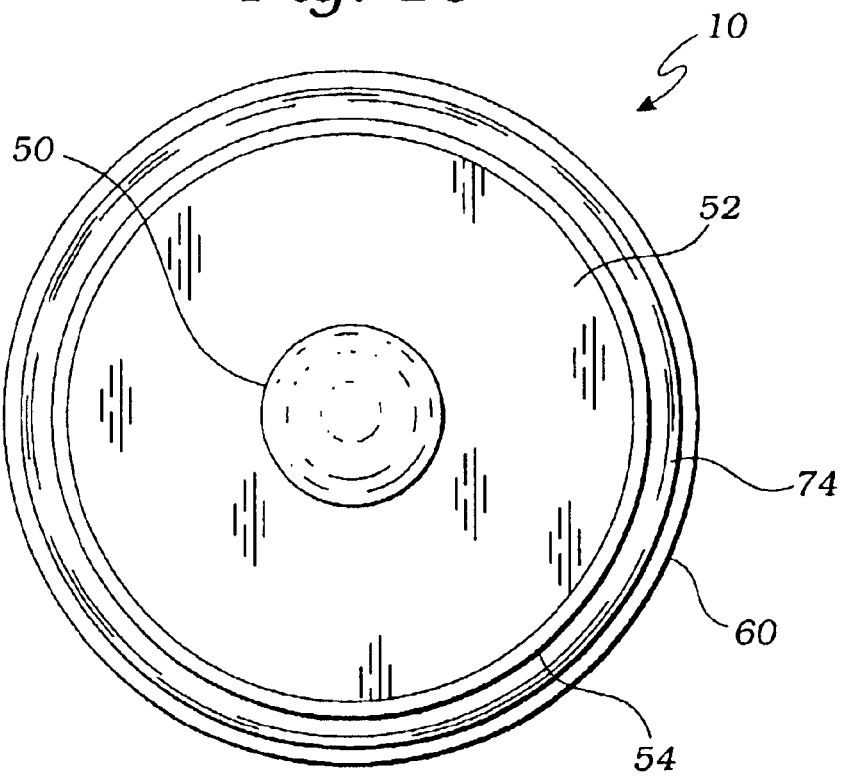
FIG. 11 is a bottom plan view thereof.

In a first embodiment, as shown in FIGS. 1–3 and 5–6, the LED light bulb 10 has a bulb base 48 that supports at least one LED, preferably a plurality of LEDs 61. As shown in FIGS. 3 and 6, the bulb base 48 has an electrical contact 50, an outer sidewall 54, and an insulator 52 between the electrical contact 50 and the outer sidewall 54. The outer sidewall 54 has an upper edge 56 and a bottom edge 58, and is preferably generally cylindrical in shape. The outer sidewall 54 is preferably constructed of an electrically conductive material such as steel.

Figure 4:
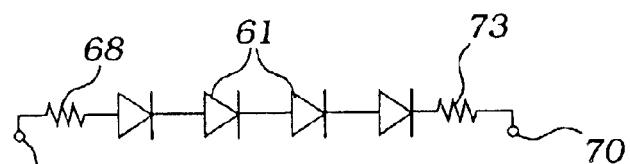
FIG. 4 is an electrical schematic thereof.
Figure 5:
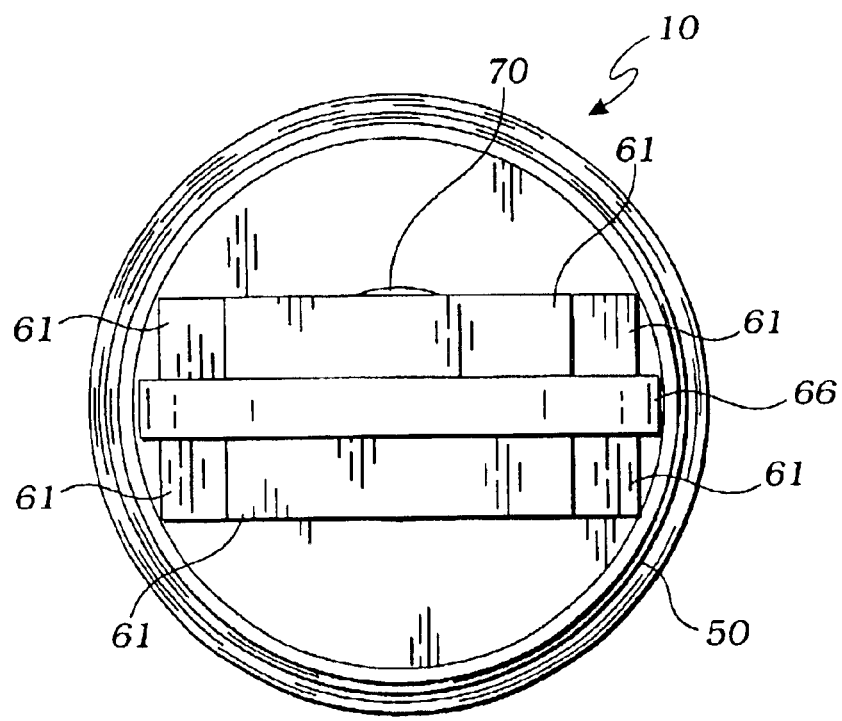
FIG. 5 is a top plan view thereof.

As shown in FIGS. 3 and 4, the electrical contact 50 is in electrical communication the plurality of LEDs 61, preferably through a first conductor 62 that is electrically connected to a first connection point 64 of the bulb circuit board 66. As shown in FIG. 4, the plurality of LEDs 61 are in electrical communication with the electrical contact 50 through a first resistor 68. The plurality of LEDs 61 preferably includes four LEDs that are connected to each other in series. The four LEDs 61 are then connected to a second resistor 73, which is then connected to a second connection point 70. As shown in FIG. 3, the second connection point 70 is electrically connected to the outer sidewall 54, preferably through a second conductor 72. While this arrangement is preferred, those skilled in the art can devise other arrangements, and any equivalent arrangements should be considered within the scope of the claimed invention.

As shown in FIGS. 1–3, the outer sidewall 54 includes a flange 74 extending outwardly from near the bottom edge 58 of the outer sidewall 54. The flange 74 may be integral with or otherwise attached to the outer sidewall 54, and is adapted to removably engage the LED light strip 12, as described in greater detail below, for removably mounting the LED light bulb 10 on the LED light strip 12.

As shown in FIGS. 1–3, the bulb circuit board 66 is preferably mounted upon the bulb base 48 such that it extends upwardly therefrom. The bulb circuit board 66 preferably has a first side 66A and a second side 66B. Each of the sides 66A and 66B is adapted to mount some of the plurality of LEDs 61, preferably three LEDs on each side. The bulb circuit board 66 is preferably inserted into the bulb base 48 such that it frictionally engages the upper edge 56 of the outer sidewall 54.

In a second embodiment, shown in FIGS. 7–11, the LED light bulb 10 may include a rigid tray 60 affixed to a upper edge 56 of the outer sidewall 54. The rigid tray 60 is constructed of a strong, rigid, and durable material and is adapted to mount the bulb circuit board 66 across the upper edge 56 of the outer sidewall 54 so that the bulb circuit board 66 covers the bulb base 48.

In this embodiment, the LED light bulb 10 may include four LEDs 61 mounted on the bulb circuit board 66 and disposed in a generally rectangular arrangement on a bulb circuit board 66 around the first and second resistors 68 and 73. The rigid tray 60 may include a plurality of studs 76 extending upwardly from the rigid tray 60. Each of the plurality of studs 76 is positioned between two of the plurality of LEDs 61, and extends upwardly above the bulb circuit board 66 to approximately the same height as the plurality of LEDs 61.

LED Light Strip

As shown in FIGS. 12–15, the plurality of LED light bulbs 10 are adapted to be used in conjunction with the LED light strip 12 shown in FIGS. 12–15. The LED light strip 12 includes a printed circuit board assembly that includes a means for removably attaching the plurality of LED light bulbs 10.

Figure 12:
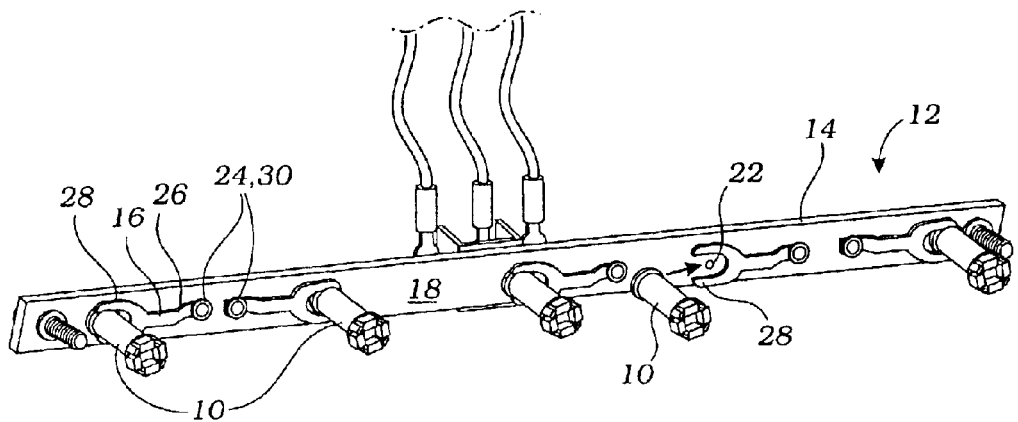
FIG. 12 is a perspective view of a first embodiment of an LED light strip illustrating how one of the LED light bulbs is mounted on the LED light strip.
Figure 13:
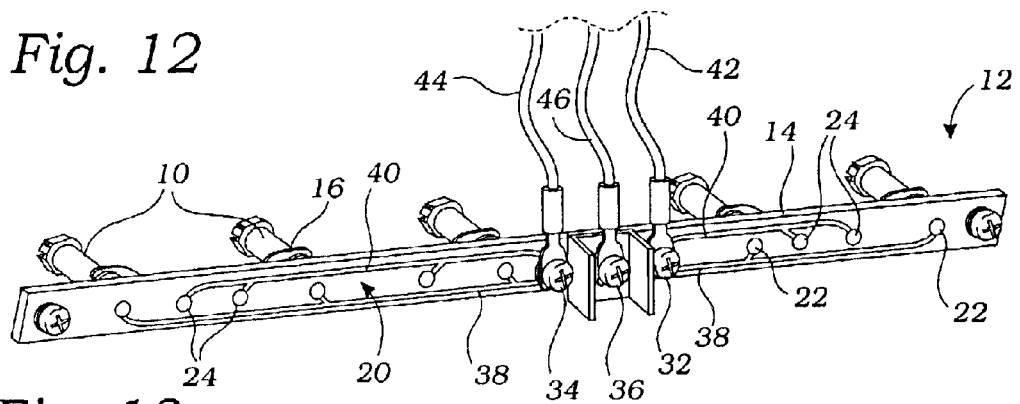
FIG. 13 is a rear perspective view thereof.
Figure 14:
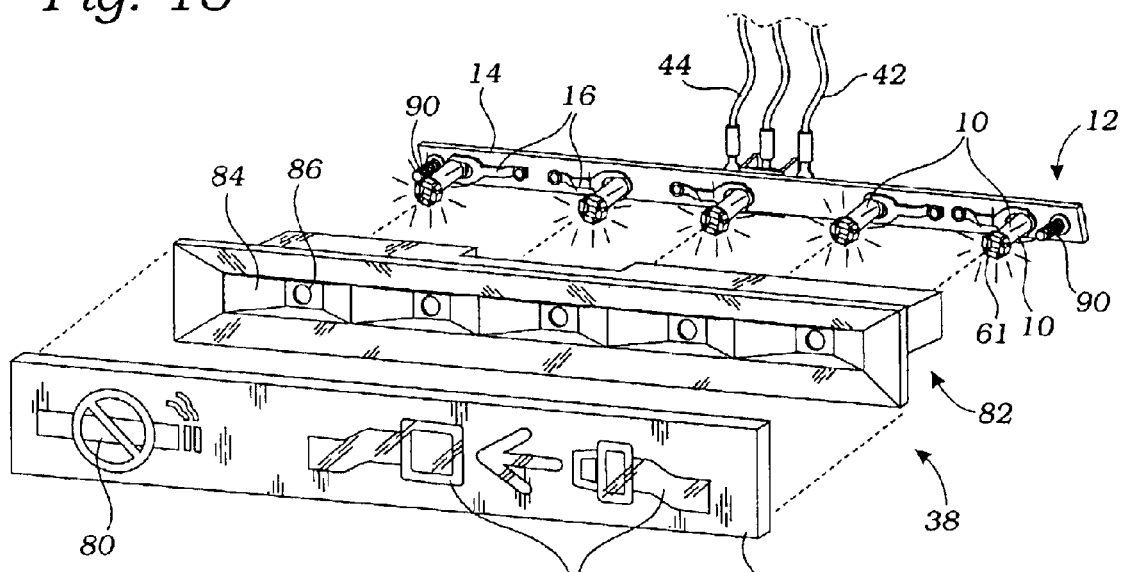
FIG. 14 is an exploded front perspective view of the LED light strip illustrating how the LED light strip is inserted into a base unit of a sign.

In a first embodiment, as shown in FIGS. 12–14, the printed circuit board assembly includes a printed circuit board 14, and the means for removably attaching includes a plurality of locking clips 16 that function to hold the plurality of the LED light bulbs 10 operably on the printed circuit board 14. The printed circuit board 14 of the LED light strip 12 has a front surface 18 and an opposing rear surface 20. A plurality of anode contacts 22 are disposed on the printed circuit board 14, preferably on the front surface 18. In the preferred embodiment, the printed circuit board 14 is an elongate shape and the plurality of anode contacts 22 are evenly spaced down the length of the printed circuit board 14; however, the printed circuit board 14 could be adapted to various alternative uses which would dictate alternative sizes and shapes.

As shown in FIG. 13, the printed circuit board 14 also includes a plurality of cathode contacts 24, each of the plurality of cathode contacts 24 being positioned in proximity to one of the plurality of anode contacts 22. As shown in FIGS. 12–14, each of the plurality of locking clips 16 is attached to one of the plurality of cathode contacts 24, and each of the plurality of locking clips 16 is adapted to removably engage one of the plurality of LED bulbs 10. Each of the plurality of locking clips 16 preferably has a clip base 26 that extends to a forked end 28 and is constructed of an electrically conductive material. In the preferred embodiment, each of the plurality of locking clips 16 is constructed of a resilient material such as spring steel so that each of the plurality of locking clips 16 can function to clamp one of the plurality of LED light bulbs 10 against the printed circuit board 14. The clip base 26 of each of the plurality of locking clips 16 is fastened to the printed circuit board 14 and electronically connected to one of the plurality of cathode contacts 24 such that the forked end 28 is positioned over one of the plurality of anode contacts 22. In one embodiment, the clip base 26 is fastened to the printed circuit board 14 with a fastener such as a rivet 30 or similar fastening device.

As shown in FIGS. 12 and 13, the printed circuit board 14 includes an anode connection point 32 and a cathode connection point 34 to enable the printed circuit board 14 to be electrically connected to an outside power source (not shown). The anode connection point 32 is electrically connected to each of the plurality of anode contacts 22 through an anode bus 38. The cathode connection point 34 is electrically connected to each of the plurality of cathode contacts 24 through a cathode bus 40. The ground connection point 36 is electrically connected to a ground wire 46 for grounding the LED light strip 12. An anode wire 42 is connectable to the anode connection point 32 for connecting the LED light strip 12 to the power source (not shown). A cathode wire 44 is connectable to the cathode connection point 34 for connecting the LED light strip 12 to another LED light strip 12, if more than one of the LED light strips 12 are being used in series.

The printed circuit board 14 also includes a ground connection point 36. A ground wire 46 is connectable to the ground connection point 36 for grounding the LED light strip 12. While the present embodiment illustrates a single series of LED light bulbs 10 being connected to the printed circuit board 14, the printed circuit board 14 could include two or more sets connected in series, or any other arrangement that could be devised by those skilled in the art. Since the general construction of the printed circuit board 14 is well known to those skilled in the art, it is not described in greater detail herein.

As shown in FIGS. 12–14, the plurality of the LED light bulbs 10 may be removably fastened to the LED light strip 12 using the plurality of locking clips 16. The forked end 28 of one of the plurality of locking clips 16 is adapted to fit over the flange 74 and lock around the outer sidewall 54 of one of the plurality of LED bulbs 10, thereby forming an electrical connection between the locking clip 16 and the outer sidewall 54. The plurality of locking clips 16 also function to bias each of the plurality of LED light bulbs 10 against one of the plurality of anode contacts 22.

As shown in FIG. 14, the LED light strip 12 is preferably used in conjunction with a sign 78 that includes at least one translucent portion 80. One example of the sign 78 includes a no-smoking sign such as is typically used in airplanes. The no-smoking sign 78 includes a base unit 82 having a plurality of recesses 84 that each include one of a plurality of bulb apertures 86. Each of the plurality of bulb apertures 86 is shaped, spaced, and otherwise adapted to receive one of the plurality of LED light bulbs 10 mounted upon the printed circuit board 14 of the LED light strip 12. The no-smoking sign 78 further includes a cover plate 88 that is adapted to attach to the base unit 82 to cover the plurality of recesses 84. The cover plate 88 has the at least one translucent portion 80 that enables light from the plurality of LED light bulbs 10 to shine through and thereby form a lighted signal.

Finally, the no-smoking sign 78 further includes a means for fastening the LED light strip 12 securely to the base unit 82 of the no-smoking sign 78. The means for fastening may be a pair of screws 90 in one embodiment; however, any similar fastener or equivalent should be considered within the scope of the claimed invention. Furthermore, at least one of the plurality of LEDs 61 may be a colored LED, so that the at least one translucent portion 80 may be clear or at least uncolored and still provide a colored signal. It is common, for example, that the signal should be red or another color, and this can be provided by using LEDs that are red. This is not possible using ordinary incandescent bulbs, which require a colored filter to provide the sign 78 with a colored output.

Figure 15:
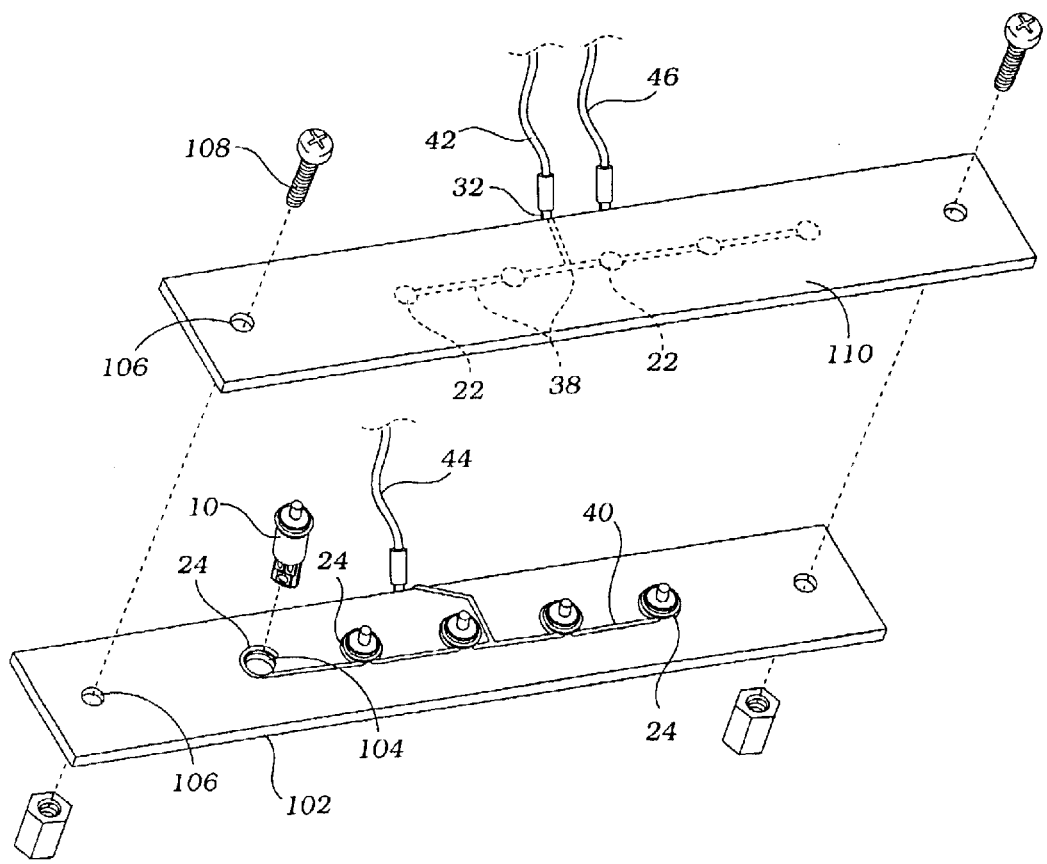
FIG. 15 is an exploded rear perspective view of a second embodiment of the LED light strip.

In a second embodiment, as shown in FIG. 15, the printed circuit board assembly includes a first circuit board 102 and a second circuit board 110. In this embodiment, the means for removably attaching includes a plurality of bulb apertures 104 through the first circuit board 102. In this embodiment, the plurality of anode contacts 22 are provided on the second circuit board 110, as is the anode bus 38 and the anode connection point 32 for the anode wire 42. The plurality of cathode contacts 24 are printed upon the first circuit board 102 adjacent each of the plurality of bulb apertures 104 and connected by the cathode bus 40 with the cathode connection point 34 and the cathode wire 44.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An LED light strip comprising:

a printed circuit board having a front surface;

a plurality of anode contacts disposed on the front surface;

a plurality of cathode contacts, each of the plurality of cathode contacts being positioned near one of the plurality of anode contacts;

a plurality of locking members, each of the plurality of locking members having a base and a first end, the base of each of the plurality of locking members being fastened to the printed circuit board and electronically connected to one of the plurality of cathode contacts such that said first end is positioned over one of the plurality of anode contacts, the plurality of locking members being electrically conductive; and a plurality of LED light bulbs, each of the plurality of LED light bulbs having a bulb base that supports at least one LED, the bulb base having an electrical contact, an outer sidewall, an insulator between the electrical contact and the outer sidewall, and a flange extending outwardly from the outer sidewall, said flange and locking members enabling said plurality of LED light bulbs to be removably connected to said printed circuit board; and the flange further being adapted to fit under said first end of one of the plurality of locking members thereby holding the electrical contact against one of the plurality of anode contacts.

2. The LED light strip of claim 1 further comprising a sign having at least one translucent portion, wherein said sign includes a base unit and a cover plate, the base unit having a plurality of recesses that each include one of a plurality of bulb apertures, each of the plurality of bulb apertures being adapted to receive one of the plurality of LED light bulbs mounted upon said printed circuit board, the cover plate being adapted to attach to the base unit to cover the plurality of recesses such that at least one translucent portion of the cover plate is positioned over the plurality of LED light bulbs.

3. A sign assembly comprising:

a printed circuit board assembly;

a plurality of anode contacts disposed on the printed circuit board assembly;

a plurality of cathode contacts disposed on the printed circuit board assembly;

a plurality of LED light bulbs, each of the plurality of LED light bulbs having a bulb base that supports at least one LED and a resistor, the bulb base having an electrical contact, an outer sidewall, an insulator between the electrical contact and the outer sidewall, the outer sidewall including a flange extending outwardly form the outer sidewall, the electrical contact being in electrical communication with the outer sidewall through the resistor and the at least one LED;

means for removably attaching each of the plurality of LED light bulbs to the printed circuit board assembly such that the electrical contact of each of the plurality of LED light bulbs is in electrical communication with one of the anode contacts, and such that the outer sidewall is in electrical contact with one of the plurality of cathode contacts;

a sign having a translucent portion; and means for mounting the sign on said printed circuit board assembly such that said translucent portion is positioned adjacent to at least one of said plurality of LED light bulbs.

4. The LED light strip of claim 3 wherein the sign includes a base unit and a cover plate, the base unit having a plurality of recesses that each include one of a plurality of bulb apertures, each of the plurality of bulb apertures being adapted to receive one of the plurality of LED light bulbs mounted upon the printed circuit board of the LED light strip, the cover plate being adapted to attach to the base unit to cover the plurality of recesses such that at least one translucent portion of the cover plate is positioned over the plurality of LED light bulbs.

* * * * *